US008681159B2

(12) United States Patent
Culbert et al.

(10) Patent No.: US 8,681,159 B2
(45) Date of Patent: Mar. 25, 2014

(54) METHOD AND APPARATUS FOR SWITCHING BETWEEN GRAPHICS SOURCES

(75) Inventors: Michael F. Culbert, Monte Serena, CA (US); David G. Conroy, El Granada, CA (US); William C. Athas, San Jose, CA (US); Brian D. Howard, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 1280 days.

(21) Appl. No.: 11/499,167

(22) Filed: Aug. 4, 2006

(65) Prior Publication Data
US 2008/0030509 A1 Feb. 7, 2008

(51) Int. Cl.
*G06F 15/16* (2006.01)
(52) U.S. Cl.
USPC .......................................... 345/502
(58) Field of Classification Search
USPC .......... 345/501–506, 519–520, 522; 713/324, 713/375
See application file for complete search history.

(56) References Cited

U.S. PATENT DOCUMENTS

| | | | |
|---|---|---|---|
| 5,621,431 A | 4/1997 | Harper et al. | |
| 6,385,267 B1 * | 5/2002 | Bowen et al. | 375/376 |
| 6,424,320 B1 * | 7/2002 | Callway | 345/1.1 |
| 6,535,208 B1 * | 3/2003 | Saltchev et al. | 345/213 |
| 6,624,816 B1 | 9/2003 | Jones, Jr. | |
| 6,778,187 B1 * | 8/2004 | Yi | 345/605 |
| 6,807,232 B2 | 10/2004 | Nicholson et al. | |
| 6,850,240 B1 * | 2/2005 | Jones, Jr. | 345/503 |
| 7,262,776 B1 | 8/2007 | Wilt et al. | |
| 7,576,745 B1 * | 8/2009 | de Waal et al. | 345/502 |
| 2002/0033812 A1 * | 3/2002 | Van Vugt | 345/204 |
| 2004/0075622 A1 * | 4/2004 | Shiuan et al. | 345/1.1 |
| 2004/0174367 A1 | 9/2004 | Liao | |
| 2004/0207618 A1 | 10/2004 | Williams | |
| 2005/0012749 A1 | 1/2005 | Gonzalez et al. | |
| 2005/0093854 A1 | 5/2005 | Kennedy | |
| 2005/0237327 A1 | 10/2005 | Rubinstein et al. | |
| 2005/0244131 A1 | 11/2005 | Uehara | |
| 2005/0285863 A1 | 12/2005 | Diamond | |
| 2005/0289361 A1 | 12/2005 | Sutardja | |

(Continued)

FOREIGN PATENT DOCUMENTS

| | | |
|---|---|---|
| EP | 0497377 A2 | 8/1992 |
| EP | 1061434 A2 | 12/2000 |
| JP | 5-113785 | 5/1993 |

(Continued)

OTHER PUBLICATIONS

Gardner, Floyd M., "Charge-Pump Phase-Lock Loops", IEEE Transactions on Communications, vol., Com-28, No. 11, Nov. 1980, pp. 1849-1858.

*Primary Examiner* — Allison W Johnson
(74) *Attorney, Agent, or Firm* — Jennifer Luh

(57) ABSTRACT

One embodiment of the present invention provides a system that switches from a first graphics processor to a second graphics processor to drive a display. During operation, the system receives a request to switch a signal source which drives the display from the first graphics processor to the second graphics processor. In response to the request, the system first configures the second graphics processor so that the second graphics processor is ready to drive the display. Next, the system switches the signal source that drives the display from the first graphics processor to the second graphics processor, thereby causing the second graphics processor to drive the display.

22 Claims, 8 Drawing Sheets

(56) References Cited

U.S. PATENT DOCUMENTS

| | | |
|---|---|---|
| 2006/0007203 A1 | 1/2006 | Chen et al. |
| 2006/0012540 A1 | 1/2006 | Logie |
| 2006/0197768 A1 | 9/2006 | Van Hook et al. |
| 2006/0284884 A1 | 12/2006 | Cahill, III |
| 2007/0139445 A1 | 6/2007 | Khan et al. |
| 2007/0283175 A1 * | 12/2007 | Marinkovic et al. .......... 713/320 |
| 2008/0186319 A1 | 8/2008 | Boner |

FOREIGN PATENT DOCUMENTS

| | | |
|---|---|---|
| JP | 200612126 | 1/2006 |
| WO | 02086745 A2 | 10/2002 |
| WO | 2006055608 A2 | 5/2006 |
| WO | 2007140404 A2 | 12/2007 |

* cited by examiner

METHOD AND APPARATUS FOR SWITCHING BETWEEN GRAPHICS SOURCES

BACKGROUND

1. Field of the Invention

The present invention relates to techniques for switching between graphics sources in computer systems. More specifically, the present invention relates to a method and an apparatus for reducing power by switching between graphics sources in a computer system.

2. Related Art

Rapid advances in computing technology have made it possible to perform trillions of computational operations each second on data sets that are sometimes as large as a trillion bytes. These advances can be largely attributed to the exponential increase in the size and complexity of integrated circuits. Unfortunately, the increase in size and complexity of integrated circuits has been accompanied by a similar increase in their power consumption.

In a parallel development, the rapid proliferation of broadband wireless networks has created an insatiable demand for portable computer systems. Unfortunately, portable computer systems usually have stringent power constraints due to the limited battery power that is available to them. These developments have created a strong need for techniques and systems to save power.

Advances in 3D graphics technology has led most of the modern computer systems to use dedicated graphics processors (sometimes referred to as graphics processing units (GPU)) to drive graphics display devices. Unfortunately, today's GPUs consume a large amount of power, which severely shortens the battery life of portable computer systems, and also causes heat dissipation problems.

During a graphics display operation, there are often times when very little graphics processing is needed, for example, when the user is reading a document on the display. Unfortunately, prior art graphics processors cannot switch to a sufficiently low-power mode in order to conserve enough power during these "low activity" periods.

One solution to save power during such "low activity" periods is to switch the display from a high-power graphics source (e.g., a high-performance GPU) to a low-power graphics source (e.g., a low-performance GPU). Ideally, this switching operation should be invisible to the user, so that the system can seamlessly switch back and forth between the different graphics sources as the graphics processing demands change, or as the system's need to limit power consumption changes.

A prior art technique provides a mechanical switch which allows a user to switch between a lower-performance graphics source and a higher-performance graphics source. However, this brute-force technique requires the user to fully re-initialize the computer system each time the user switches from one graphics source to another. Requiring a user to re-initialize the computer system to switch from one graphics source to another is simply not acceptable in many situations. An initialization process is one of the most disruptive operations that can be performed on the computer. Typically the user has to save all his or her work before re-initializing the computer, which can take a considerable time to complete. Furthermore, the user must first decide whether their graphics processing requirements will be high or low in the near future, and then wait for the system to re-initialize, and then be willing to wait for another re-initialization if the requirements change.

Hence, what is needed is a method and an apparatus that facilitates rapid and/or seamless switching between different graphics sources.

SUMMARY

One embodiment of the present invention provides a system that switches from a first graphics processor to a second graphics processor to drive a display. During operation, the system receives a request to switch a signal source which drives the display from the first graphics processor to the second graphics processor. In response to the request, the system first configures the second graphics processor so that the second graphics processor is ready to drive the display. Next, the system switches the signal source that drives the display from the first graphics processor to the second graphics processor, thereby causing the second graphics processor to drive the display.

In a variation on this embodiment, the first graphics processor's output display signals are coupled to a first set of inputs of a selecting device while the second graphics processor's output display signals are coupled to a second set of inputs of the selecting device. The selecting device's outputs are coupled to the display's inputs, and wherein prior to switching the signal source which drives the display from the first graphics processor to the second graphics processor, the first set of inputs are coupled to the selecting device's outputs. Switching from the first graphics processor to the second graphics processor involves decoupling the first set of inputs from the selecting device's outputs, and coupling the second set of inputs to the selecting device's outputs.

In a further variation on this embodiment, prior to switching the signal source which drives the display from the first graphics processor to the second graphics processor, the system substantially synchronizes the first graphics processor's output display signals and the second graphics processor's output display signals, thereby facilitating a seamless switching process which does not disrupt graphical output on the display.

In a further variation on this embodiment, the system substantially synchronizes the output display signals by: (1) substantially synchronizing the first graphics processor's timing signals and the second graphics processor's timing signals; and (2) substantially synchronizing the first graphics processor's data signals and the second graphics processor's data signals.

In a further variation on this embodiment, the system substantially synchronizes the output display signals by substantially aligning synchronization signals from the two graphics processors.

In a further variation on this embodiment, the synchronization signal is a display blanking signal.

In a further variation on this embodiment, the display blanking signal is a vertical blanking signal.

In a further variation on this embodiment, the switching takes place during a blanking interval associated with the display blanking signal.

In a further variation on this embodiment, the blanking interval is a vertical blanking interval.

In a further variation on this embodiment, the selecting device can include a multiplexer or a wired-OR logic.

In a variation on this embodiment, the system configures the second graphics processor by: (1) powering up the second graphics processor if necessary; (2) initializing the second graphics processor; and (3) generating output signals from the second graphics processor.

In a variation on this embodiment, prior to receiving the request to switch, the system monitors a level of graphics processing load. The system then generates the request to switch based on the level of graphics processing load.

In a further variation on this embodiment, the first graphics processor is a high-power graphics processing unit (GPU) and the second graphics processor is a low-power GPU. In this case, a request to switch is generated when the level of graphics processing load is low.

In a further variation on this embodiment, the first graphics processor is a low-power graphics processing unit (GPU) and the second graphics processor is a high-power GPU. In this case, a request to switch is generated when the level of graphics processing load is high.

In a further variation on this embodiment, the low-power GPU is integrated with one of the system chips.

In a variation on this embodiment, the system powers down the first graphics processor after the switching.

In a further variation on this embodiment, the system substantially synchronizes the output display signals by using one or more phase-locked loops (PLL).

In a variation on this embodiment, switching from the first graphics processor to the second graphics processor involves fading-out the display using the first graphics processor.

In a variation on this embodiment, the system drives the display using the second graphics processor by: (1) initializing the display if necessary; (2) redrawing the display; and (3) fading-in the display.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Computer System

Figure 1:
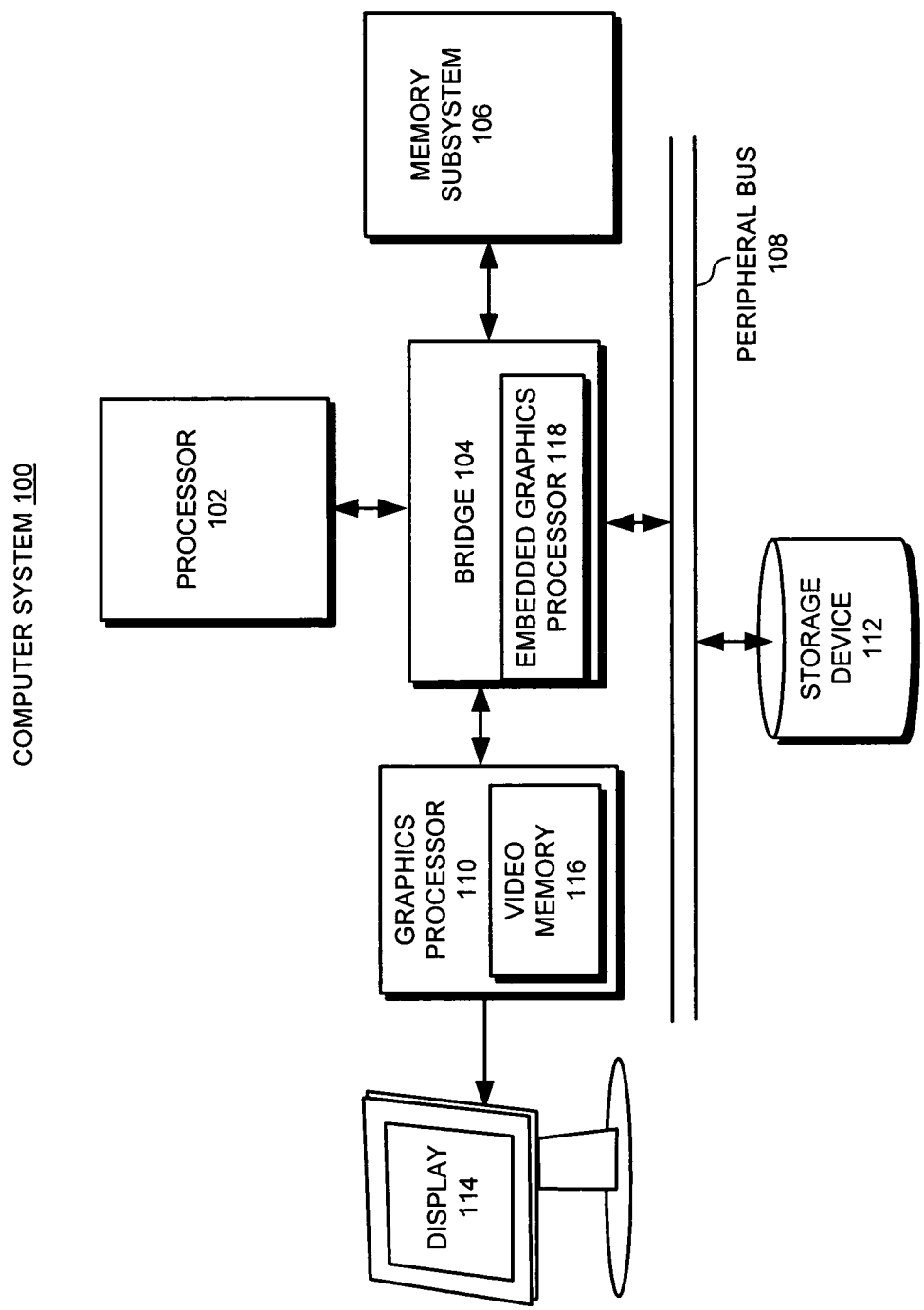
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory subsystem 106, peripheral bus 108, and to a graphics processor 110 through bridge 104. Bridge 104 can include any type of core logic unit, bridge chip, or chipsets that are commonly used to couple together components within computing system 100. In one embodiment of the present invention, bridge 104 is a northbridge chip. Processor 102 can include any type of processor, including, but not limited to, a microprocessor, a digital signal processor, a device controller, or a computational engine within an appliance.

It should be recognized that one or more components of the computer system 100 may be located remotely and accessed via a network.

Processor 102 communicates with memory subsystem 106 through bridge 104. Memory subsystem 106 can include a number of components, including one or more memory chips which can be accessed by processor 102 at high speed.

Processor 102 also communicates with storage device 112 through bridge 104 and peripheral bus 108. Storage device 112 can include any type of non-volatile storage device that can be coupled to a computer system. This includes, but is not limited to, magnetic, optical, and magneto-optical storage devices, as well as storage devices based on flash memory and/or battery-backed up memory.

Processor 102 additionally communicates with graphics processor 110 through bridge 104. Graphics processor 110 is a specialized graphics rendering device that provides a signal source to display 114 and drives display 114. Display 114 can include any type of display device that can present information in a visual format (including images and text) to a user. This includes, but is not limited to, cathode ray tube (CRT) displays, light-emitting diode (LED) displays, liquid-crystal displays (LCD), organic LED (OLED) displays, surface-conduction electron-emitter displays (SED), or electronic paper.

Graphics processor 110 performs both 2D and 3D graphics rendering operations, such as lighting, shading, transforming, with high performance. To achieve the high performance, graphics processor 110 may utilize dedicated video memory 116 to store frame buffers, textures, vertex arrays, and/or display lists.

Bridge 104 also includes an embedded graphics processor 118. Embedded graphics processor 118 is typically built for modest performance graphics processing purposes, and hence consumes much less power than graphics processor 110. Note that in FIG. 1, embedded graphics processor 118 is not directly coupled to and does not drive display 114.

Note that although the present invention is described in the context of computer system 100 illustrated in FIG. 1, the present invention can generally operate on any type of computing device that supports more than one graphics processor. Hence, the present invention is not limited to the computer system 100 illustrated in FIG. 1.

Selectively Switching Between Graphics Sources

Figure 2:
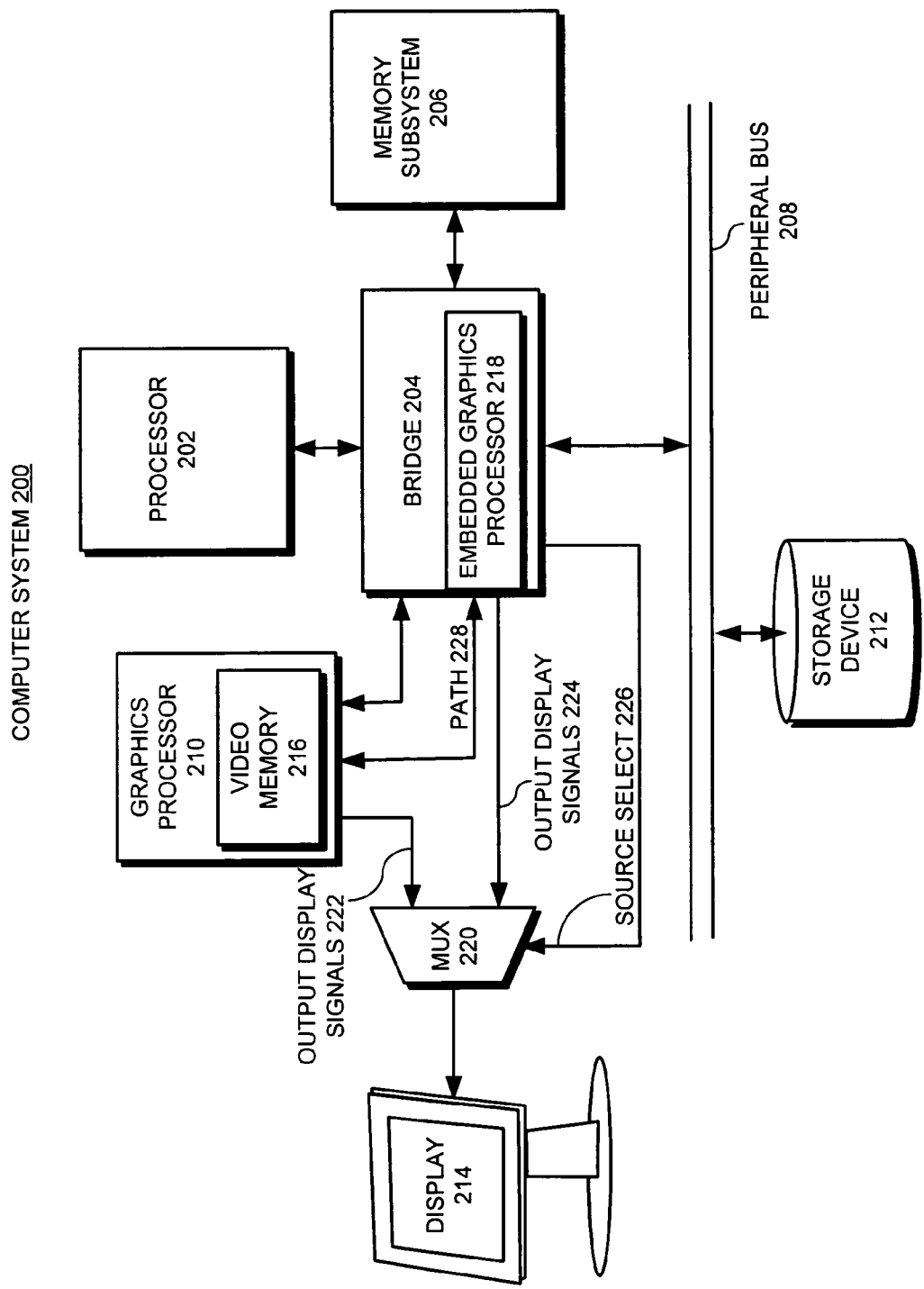
FIG. 2 illustrates a computer system which can switch between different graphics sources to drive the same display in accordance with an embodiment of the present invention.

FIG. 2 illustrates a computer system 200 which can switch between different graphics sources to drive the same display in accordance with an embodiment of the present invention. Note that in FIG. 2, the two graphics sources: graphics processor 210 and embedded graphics processor 218 can each independently drive display 214. However, the graphics source that actively drives display 214 at a given time is determined by selecting device 220 which can select between the two graphics sources. Specifically, computer system 200 can use selecting device 220 to select a graphics source based on its current operation conditions.

More specifically, output display signals 222 from graphics processor 210, and output display signals 224 from embedded graphics processor 218 are both coupled to inputs of a two-to-one multiplexer (MUX) 220. The output of MUX 220 is controlled by source select 226, which determines which one of the two graphics sources should drive display 214. In this embodiment, source select 226 is the output of bridge chip 204, which comprises specific logic for generating source select 226. Note that source select 226 can also be produced by a logic block other than bridge 204.

The output display signals from the selected graphics source is then coupled to the inputs of display 214 and actively drives it. Although the selecting device is shown as a multiplexer, it can also include any other type of selecting device, such as a simple wired-OR logic.

In one embodiment of the present invention, graphics processor 210 and embedded graphics processor 218 can cooperate through a path 228, so that they can synchronize their output display signals. Because the output display signals can include both timing signals and data signals, synchronizing the output display signals can involve synchronizing both the respective timing signals and the respective data signals. Note that path 228 can be realized using hardware and/or software to facilitate synchronizing the two graphics sources.

In one embodiment of the present invention, graphics processor 210 is a high-performance graphics processor unit (GPU) which consumes a large amount of power, whereas embedded graphics processor 218 is a lower-performance GPU which consumes a smaller amount of power. In this embodiment, when the graphics processing load is light, the system switches the graphics source from graphics processor 210 to embedded graphics processor 218 to drive display 214, and subsequently powers down graphics processor 210 entirely, thereby saving power. On the other hand, when the graphics processing load becomes heavy again, the system switches graphics source from embedded graphics processor 218 back to graphics processor 210.

Note that although we have described switching between graphics processors in the context of between a standalone graphics processor and an integrated graphics processor illustrated in FIG. 2, the present invention can generally work for a computer system comprising two or more graphics processors, wherein each of the graphics processors can independently drive the display when properly configured. Moreover, these multiple graphics processors can have different operating characteristics, including different power consumption levels. Furthermore, each of the multiple graphics processors can be either a standalone graphics processor or an integrated graphics processor within a chip. Hence, the present invention is not limited to the computer system 200 illustrated in FIG. 2.

Note that the above-described switching technique between different graphics sources does not require shutting down the computer system or re-initializing the computer system. As a result, the switching process can take substantially less time than it would have if a re-initialization were required. Consequently, the present invention allows rapid and frequent switching between the graphics processors.

Figure 3:
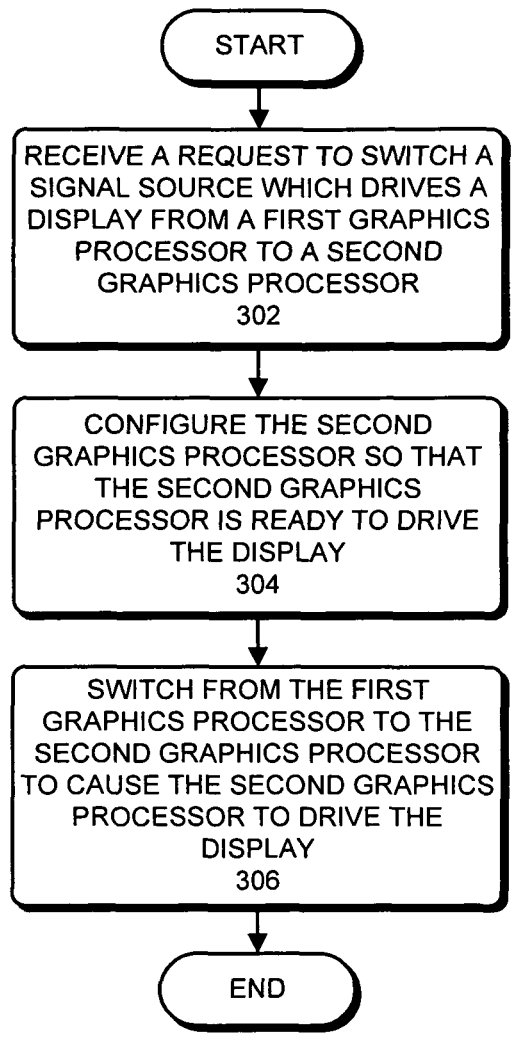
FIG. 3 presents a flowchart illustrating the process of switching from a first graphics source to a second graphics source to drive a display in accordance with an embodiment of the present invention.

FIG. 3 presents a flowchart illustrating the process of switching from a first graphics source to a second graphics source to drive a display in accordance with an embodiment of the present invention.

During operation, the system first receives a request to switch the signal source for the display from a first graphics processor which is actively driving the display to a second graphics processor which is in a non-active state (step 302). The switching request can be generated by a user who is aware of levels of graphics processing load. Alternatively, the switching request can be generated internally by the system.

In one embodiment of the present invention, system software continuously monitors the level of graphics processing load. More specifically, the system can determine the level of graphics processing load based on a condition in a graphics command queue associated with the graphics processor. For example, if the command queue is mostly empty, the system asserts a low graphics processing load. On the other hand, if the command queue is mostly full, the system asserts a high graphics processing load.

Next, based on the level of the graphics processing load, the system software selects one of the two graphics processors, and subsequently generates the request to switch if the non-active graphics processor is selected.

For example, if the first graphics processor is a high-performance GPU that consumes high power, when the system software detects a considerable decrease in the level of graphics processing load, the system software can issue a request to switch to a second graphics processor which has lower performance, but which also consumes much less power. On the other hand, if the first graphics processor is a lower-performance and low-power GPU, the system can issue a request to switch to a high-performance and high-power GPU if the system software detects a considerable increase in the level of graphics processing load.

Note that using system software to monitor the graphics processing load and to automatically issue switching request is significantly faster and possibly more energy efficient than a human initiated request. Furthermore, using system software can free the user from doing the monitoring job.

Next, in response to the switching request, the system configures the second graphics processor in preparation to drive the display (step 304). In one embodiment of the present invention, configuring the second graphics processor can involve one or more of the following steps: (1) powering up the processor if it is currently powered down; (2) initializing the graphics processor; and (3) generating output signals in preparation to power up the display.

The system then switches the signal source which drives the display from the first graphics processor to the second graphics processor, which causes the second graphics processor to drive the display (step 306). In one embodiment of the present invention, the switching involves using a selecting device such as MUX 220 in FIG. 2, which decouples the first graphics processor and couples the second graphics processor to the display. During the switching operation, different timing controls can be used which will be described in more details below. In general, obtaining smoother switching transition requires more precise timing control, hence typically requires a more complex switch-controlling mechanism.

Once the second graphics processor takes over from the first graphics processor, the system may power down the first graphics processor to conserve power. Note that the above-described switching process does not require re-initializing the whole system to take effect.

Note that although we have described switching based on graphics processing load, the switch request can also be generated based on power conditions (e.g., whether the system is running on a battery or an external power source, or whether the battery is low), based on a need to reduce system heat dissipation, based on a user preference, or based on any feature or capability that is different between the two graphics processors.

Timing During Switching

Switching between different graphics processors to drive the same display device requires a certain level of cooperation between the graphics processors to ensure a substantially seamless transition. We discuss different timing techniques during a switching below by distinguishing them based on whether synchronization is involved in the output display signals.

Switching without Synchronization

Figure 4:
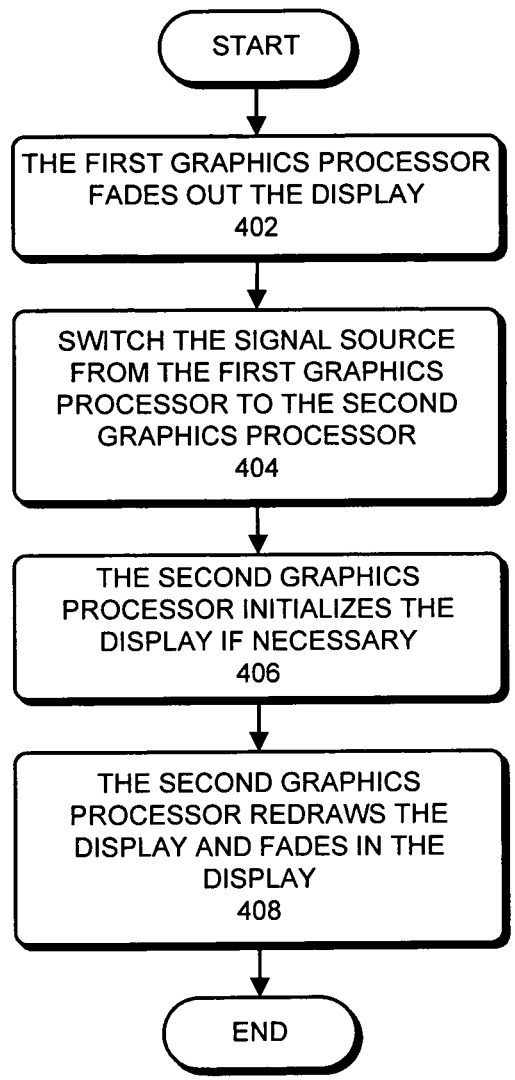
FIG. 4 presents a flowchart illustrating the process of switching from the first graphics source to the second graphics source without synchronizing the output display signals in accordance with an embodiment of the present invention.

FIG. 4 presents a flowchart illustrating the process of switching from the first graphics source to the second graphics source without synchronizing the output display signals in accordance with an embodiment of the present invention.

During operation, the first graphics processor fades-out the display (step 402). Note that this can be done in a number of ways, including, but not limited to, displaying black or other colors on the screen, turning off the backlight, or powering down the entire display.

Next, the system switches the signal source that drives the display from the first graphics processor to the second graphics processor, which has been configured to drive the display (step 404). More specifically, the switching involves decoupling the first graphics processor's output signals from the input of the display and coupling the second graphics processor's output signals to the input of the display.

Upon completing the switching, the second graphics processor then initializes the display if necessary (step 406). Next, the second graphics processor redraws the display screen and subsequently fades-in the display screen (step 408).

In this embodiment, the two graphics sources are not required to synchronize with each other. Consequently, the second signal source does not need to be configured to redraw the display before the switch takes place. Furthermore, the first signal source can be turned off (e.g., through a fade-out operation) prior to performing the switch.

Note that switching without synchronization is simple but can cause the user to notice the switch. However, if the switching can be completed within a fraction of a second, the user may not even notice the switch. Alternatively, if the switching is done more slowly, the visual disruption can be reduced by using an appropriate visual effect, such as a fade-out/fade-in effect used when display resolution is changed. Generally, any undesirable visual effects of switching the display from one set of display signals to a different, unsynchronized set of display signals can be hidden by fading out the display during the transition.

Switching with Synchronization

Synchronizing the output signals prior to switching facilitates a smoother, less noticeable, or even seamless switching process which does not disrupt graphical output on the display. However, the synchronization requires the second graphics source to start generating output signals in preparation to drive the display prior to the switching, so that the output display signals from the both graphics sources can be synchronized.

Figure 5A:
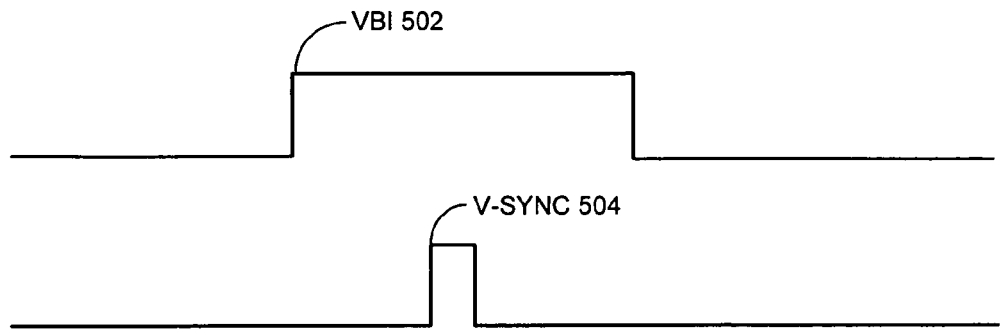
FIG. 5A illustrates a single vertical blanking interval (VBI) and a corresponding vertical synchronization (V-sync) pulse generated by a graphics source in accordance with an embodiment of the present invention.

In one embodiment of the present invention, synchronizing the output signals from the two graphics sources can be achieved by matching up timing information embedded in the output signals. Such timing information can include, but is not limited to, horizontal synchronization (H-sync) pulses, vertical synchronization (V-sync) pulses, horizontal blanking signals, and vertical blanking signals. In particular, V-sync pulses control image refresh on the display by indicating when to start scanning a new frame of data. Typically, V-sync pulses occur within a short time interval between two consecutive image frames, referred to as a vertical blanking interval (VBI), during which the display on the screen is held in a constant state for various housekeeping purposes. FIG. 5A illustrates a single VBI 502 and a corresponding V-sync pulse 504 produced by a graphics source in accordance with an embodiment of the present invention. Note that the V-sync pulse 504 falls within VBI 502.

In this embodiment, the computer system keeps track of when V-sync pulses occur in the first graphics source, and adjusts the timing sequence of the second graphics source until its V-sync pulses are aligned with the first graphics source. In one embodiment, aligning the V-sync pulses from the two graphics sources involves using either software or hardware to cause the timing sequence of the second graphics source to coincide with the first graphics source. During this alignment period, the first graphics source continues to drive the display. When the V-sync pulses are sufficiently aligned between the two sources, switching can then be performed during a next VBI.

Figure 5B:
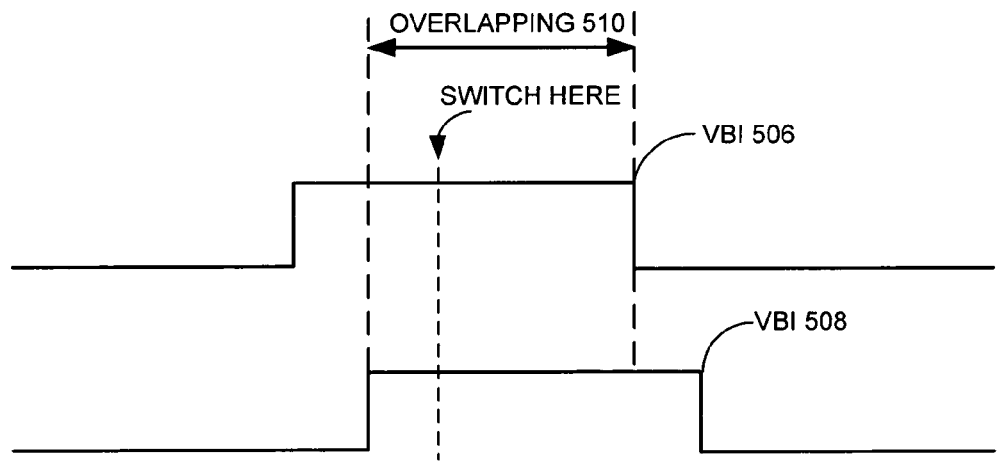
FIG. 5B illustrates two overlapping VBIs generated by two graphics sources in accordance with an embodiment of the present invention.

FIG. 5B illustrates two overlapping VBIs-VBI 506 and VBI 508 generated by two graphics sources in accordance with an embodiment of the present invention. Note that the switching occurs within overlapping period 510 of the two VBIs. Also note that the switching process may appear invisible to a user if it can be completed within overlapping period 510. Furthermore, the substantial synchronization between the two graphics sources facilitates the second graphics source to start driving the display immediately so that it appears to the user as if the display did not change.

However, it is possible for the switching process to take longer than a single VBI to complete, or to take up a few frame times to resolve. In this case, the system can hide the switching effect by blanking or fading out the screen completely.

In another embodiment of the present invention, instead of causing the second graphics source to align with the first, the system can allow the V-sync signals of the second graphics source to drift against the first graphics source. Such a drift in the timing signals can occur as a result of one or more timing differences. For example, the drift can be caused by a slight difference in the clock frequencies of two graphics processors. Alternatively, the drift can be caused by programming the two graphics processors for operating at slightly different display frame rates.

In this embodiment of synchronization, the system can monitor the two V-sync signals and detect when the two V-sync signals from the two sources overlap with each other, wherein the monitoring can be performed in either software or hardware. When this occurs, the system can switch from one graphics source to the other before the two signals drift away from each other.

Switching with Hardware-Based Synchronization

In one embodiment of the present invention, one of the graphics sources can be synchronized to the other graphics source using additional hardware, so that the display output timing of the two graphics sources can be aligned precisely. A switch can then be made during a next VBI so that the switch is undetectable by the user. In this embodiment, a smoother switch is made possible by incorporating the additional hardware to adjust the phase and frequency of the second graphics source's display timing generator to align the display output timing to that of the first graphics source.

Figure 6A:
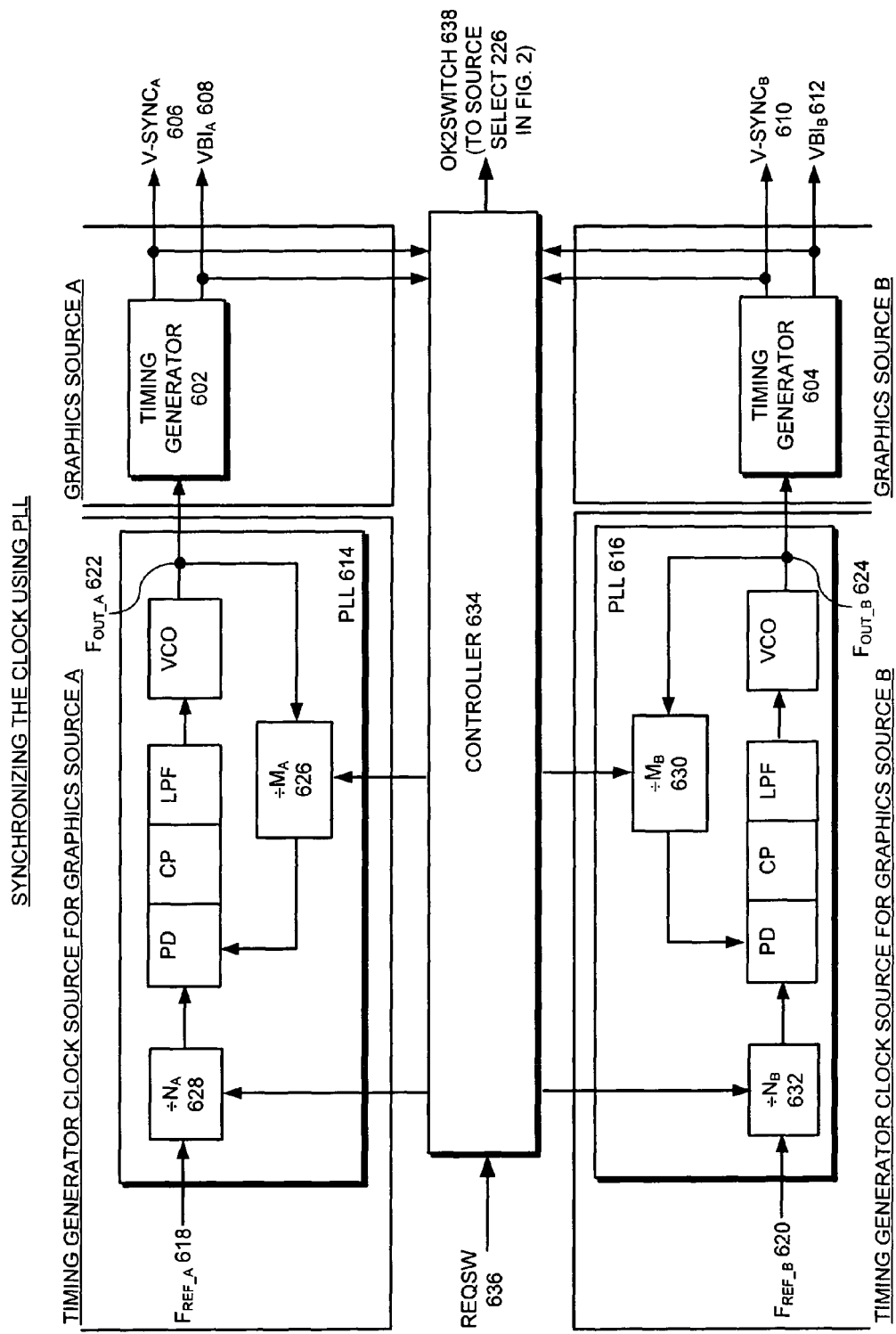
FIG. 6A presents a schematic diagram of a technique for synchronizing timing signals between two graphics sources in accordance with an embodiment of the present invention.

FIG. 6A presents a schematic diagram of a technique for synchronizing timing signals between two graphics sources in accordance with an embodiment of the present invention. As illustrated in FIG. 6A, the two graphics sources A and B comprise timing generator 602 and timing generator 604, respectively. Timing generator 602 produces V-sync pulses in output V-SYNC 606 and vertical blanking intervals in output VBI 608 for graphics source A, while timing generator 604 produces V-sync pulses in output V-SYNC 610 and vertical blanking intervals in output VBI 612 for graphics source B.

Graphics sources A and B also use phase-locked loop (PLL) 614, and PLL 616 to provide frequency references for timing generators 602 and 604, respectively. More specifically, PLL 614 and PLL 616 receive reference frequency inputs $f^A_{REF}$ 618 and $f^B_{REF}$ 620 from the left, and generate reference frequency outputs $f^A_{OUT}$ 622 and $f^B_{OUT}$ 624 as inputs to timing generators 602 and 604. A detailed explanation of the functions of a PLL and associated components can be found in a number of references that describe PLLs (see Floyd M. Gardner, "Charge-Pump Phase-Lock Loops," IEEE Transactions on Communications, Vol. 28, No. 11, November 1980).

For frequency synthesizing purposes, PLL 614 comprises a divider $M_A$ 626 and a divider $N_A$ 628. Similarly, PLL 616 comprises a divider $M_B$ 630 and a divider $N_B$ 632. The output of PLL 614 and PLL 616, when phase locked, produce output frequency $f^A_{OUT}=f^A_{REF}\times(M_A/N_A)$, and $f^B_{OUT}=f^B_{REF}\times(M_B/N_B)$, respectively.

In one embodiment of the present invention, frequency scalar values $M_A$, $M_B$, $N_A$, $N_B$ are programmable and are stored in programmable registers. Specifically, scalars $M_A$, $M_B$, $N_A$, $N_B$ are coupled to and are programmable through a controller 634, which can be implemented either in software or in hardware as microcontroller or a finite state machine. Controller 634 receives a request to switch input—REQSW 636, and additionally receives clock signals V-SYNC$_A$ 606 and VBI$_A$ 608 from graphics source A, and V-SYNC$_B$ 610 and VBI$_B$ 612 from graphics source B. Controller 634 then measures the phase difference between either the V-sync signals or VBI signals of the two graphics sources. Using the measured phase difference as a feedback signal, controller 634 can then adjust the phase of V-sync and VBI from one graphics source relative to the other graphics source by synchronously changing the M and N values in the associated PLL.

Using the feedback loop, controller 634 continues measuring and adjusting the phase difference. When controller 634 determines that the phase difference is within a predetermined bound, it then generates a switch enable—OK2SWITCH 638. In one embodiment of the present invention, OK2SWITCH 638 is coupled to source select 204 in FIG. 2, which enables MUX 220 to flip the source.

Note that the above-description allows clocks in both the active graphics source and the non-active graphics source to be changed. In particular, if the PLL scalar values being changed are associated with the source actively driving the display, it may be desirable to adjust the associated frequency slowly and smoothly. Also note that we may not need to obtain a perfect clock alignment to allow a switch. In one embodiment, controller 634 can be configured to align VBIs to obtain just enough overlap so that switching operation does not cause visible artifacts. When the controller detects there is sufficient overlap, it asserts OK2SWITCH signal to complete the synchronization.

Figure 6B:
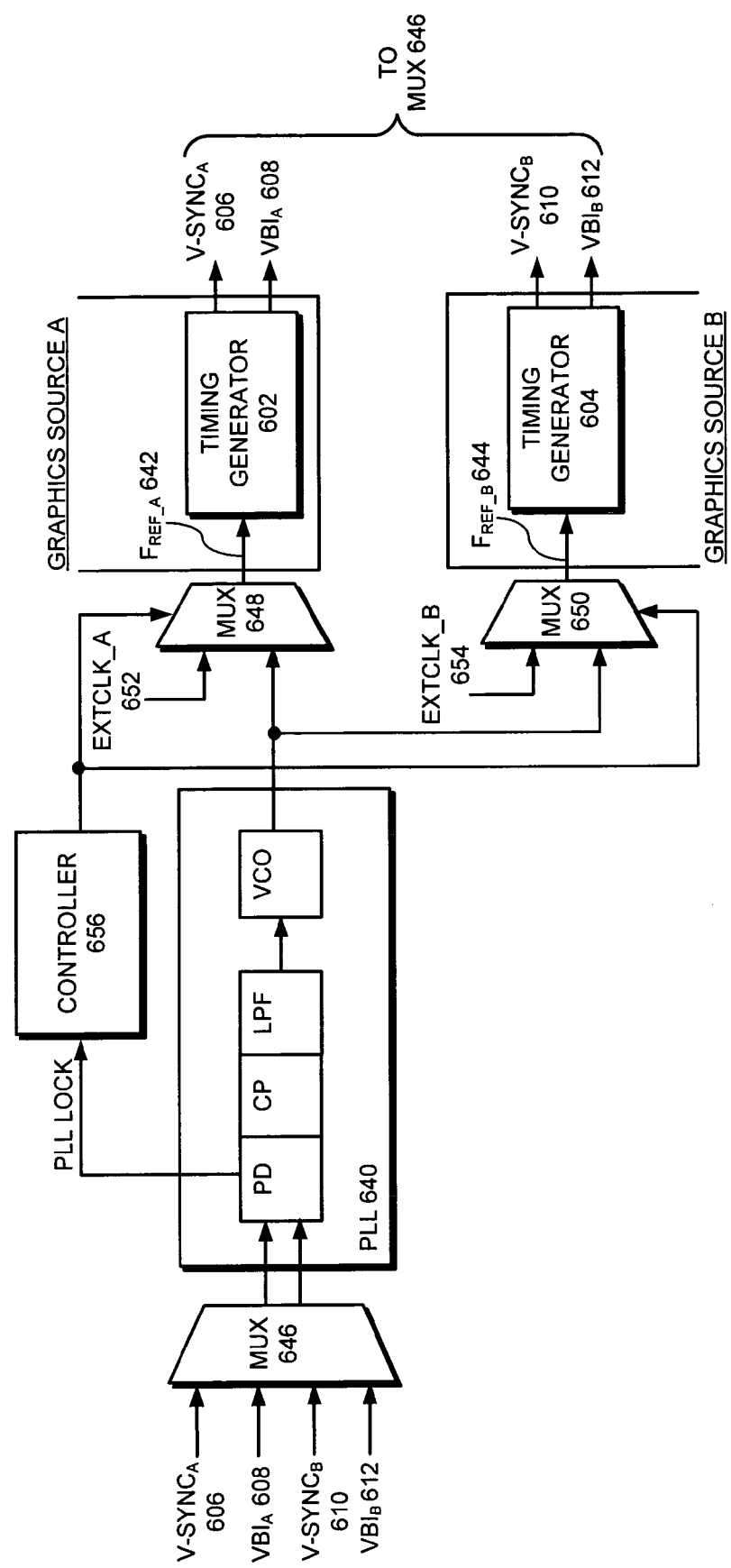
FIG. 6B presents a schematic diagram of another technique for synchronizing timing signals between two graphics sources in accordance with an embodiment of the present invention.

FIG. 6B presents a schematic diagram of another technique for synchronizing timing signals between two graphics sources in accordance with an embodiment of the present invention.

In this embodiment, a single PLL 640 is used to synchronize timing signals between the graphics sources A and B. Note that there's no direct control of the PLL by a controller as in FIG. 6A. Instead, PLL 640 forms a closed loop with one of the timing generators.

As illustrated in FIG. 6B, timing generators 602 and 604 receives reference frequency inputs $f_{REF\_A}$ 642 and $f_{REF\_B}$ 644, respectively. The four outputs from timing generators 602 and 604: V-SYNC$_A$ 606, VBI$_A$ 608, V-SYNC$_B$ 610, and VBI$_B$ 612 are coupled to a four-to-two multiplexer MUX 646, which can select either V-SYNC$_A$ 606 and V-SYNC$_B$ 610, or VBI$_A$ 608 and VBI$_B$ 612 to its outputs. The outputs of MUX 646 are then coupled to the inputs of phase detector of PLL 640. Note that either the V-sync signals or VBI signals can be used for alignment in this embodiment.

Next, the VCO output from PLL 640 is coupled to and servers as the input reference frequency for one of the timing generators, and thereby completing the closed-loop with that timing generator. More specifically, the output from PLL 640 is first coupled to the inputs of two multiplexers MUX 648 and MUX 650, which also receive external clock signals EXTCLK_A 652 and EXTCLK_B 654 as inputs, respectively. The outputs of MUX 648 and MUX 650 are controlled by controller 656, which selects either the external clock source or the PLL output as the reference frequency input for a respective timing generator. Note that controller 656 receives an input from the phase detector of PLL 640 and detects if PLL 640 has locked based on the input.

During operation, assume that graphics source A is actively driving the display. Meanwhile, the VCO output of PLL 640 is selected as the reference frequency $f_{REF\_B}$ 644 for timing generator 604 of the graphics source B. Hence, PLL 640 and timing generator 604 form a closed-loop, which facilitates the selected timing signals (either V-sync or VBI) from the two timing generators to sync-up. When controller 656 detects that PLL 640 has become phased-locked, it then switches the graphics source that drives the display from graphics source A to graphics source B during the next blanking interval. More specifically, in the following blanking interval, controller 656 switches the $f_{REF\_B}$ input from PLL 640 to the external clock source EXTCLK_B 654. After the switching, PLL 640 can then be used for locking graphics source A to graphics source B, which is now actively driving the display.

Choosing Graphics Processors without Switching

In one embodiment of the present invention, instead of switching between two graphics processors to drive the same display device, the lower-performance, lower-power graphics processor always drives the display. In this embodiment, when additional graphics performance is required, the higher-performance processor takes over the graphics processing load, rendering its display image into the same frame buffer used by the lower-performance processor. When the system is operating in this manner, the lower-performance processor acts purely as a display output device, i.e., transferring image data from the frame buffer to the display, while the higher-performance device performs all the graphics processing.

When less performance is required, the lower-performance device again takes over the graphics processing tasks, and the higher-performance device can be powered down accordingly.

Figure 7:
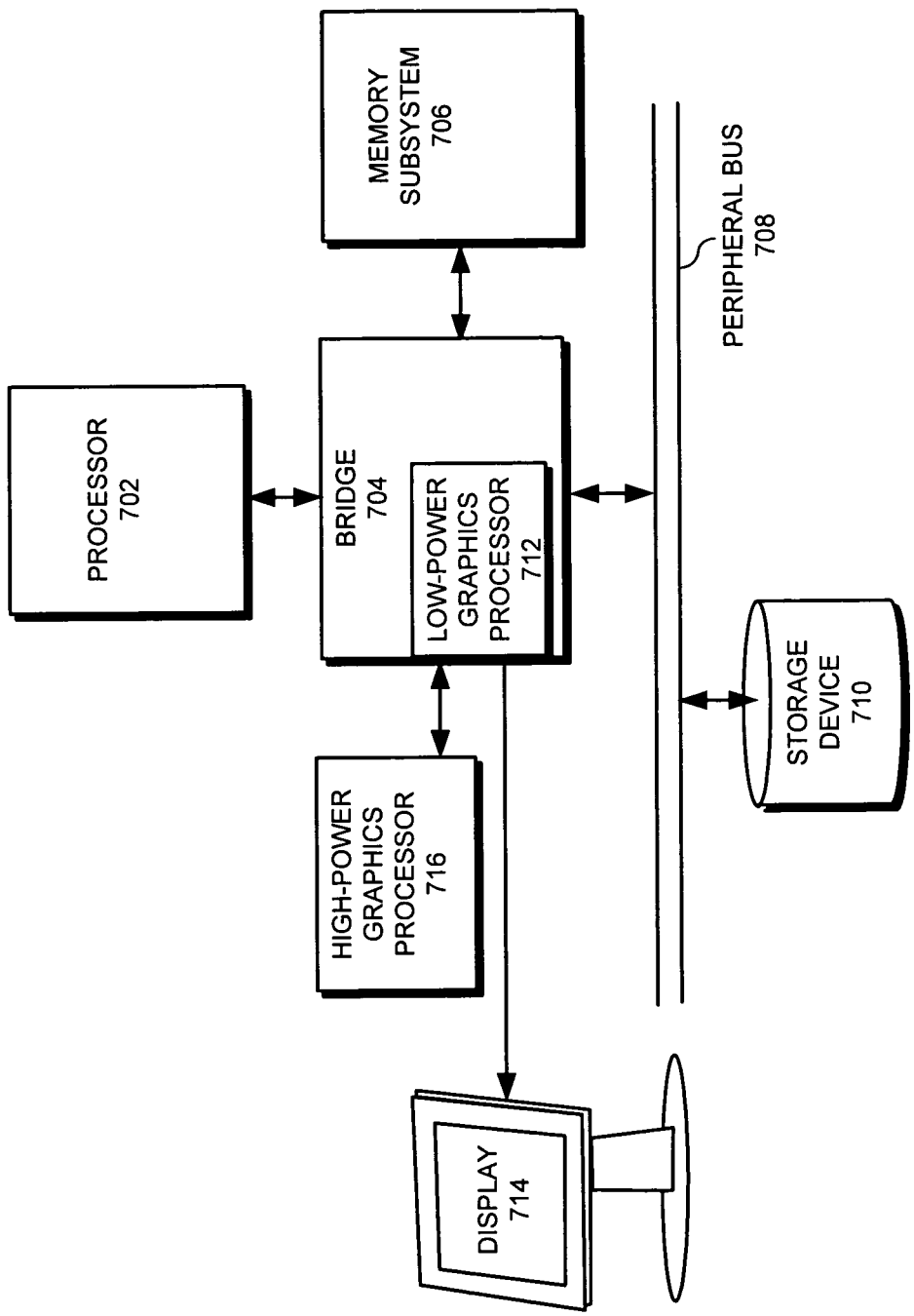
FIG. 7 illustrates a computer system comprising two graphics sources in accordance with an embodiment of the present invention.

FIG. 7 illustrates a computer system 700 comprising two graphics sources in accordance with an embodiment of the present invention. Note that lower-performance, low-power graphics processor 712 is directly coupled to display 714 and always drives it. On the other hand, high-performance, high-power graphics processor 716 is coupled to graphics processor 712, and is typically powered down when it is not in use.

When additional graphics processing power is needed, the system powers up graphics processor 716 to provide the additional graphics rendering capacity. However, instead of rendering graphics into its own frame buffer, graphics processor 716 renders images directly into the frame buffer of graphics processor 712, which is responsible for displaying the graphics on display 714 by continuously refreshing it.

Note that because the display is always driven by the same graphics processor, there is no switching hardware required, and no hardware switching transition effect to hide from the user in this approach.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for switching from a first graphics processor to a second graphics processor to drive a display, comprising:
   for a first plurality of image frames, generating a signal source which drives the display using the first graphics processor, wherein the second graphics processor is in a non-active state for the first plurality of image frames;
   receiving a request to switch the signal source which drives the display from the first graphics processor to the second graphics processor;
   in response to the request,
      configuring the second graphics processor so that the second graphics processor is ready to drive the display, wherein configuring the second graphics processor comprises substantially synchronizing output display signals from the first graphics processor and output display signals from the second graphics processor using a phase locked loop, wherein substantially synchronizing the output display signals using a phase locked loop comprises:
      generating a reference frequency input using the phase locked loop;
         selecting the reference frequency input as an input for a timing generator corresponding to the second graphics processor;
         determining that the phase locked loop is phased-locked;
      in response to determining that the phase locked loop is phase-locked, switching the signal source which drives the display from the first graphics processor to the second graphics processor, thereby causing the second graphics processor to drive the display; and
      for a second plurality of image frames, generating a signal source which drives the display using the second graphics processor, wherein the first graphics processor is in a non-active state for the second plurality of image frames.

2. The method of claim 1, wherein substantially synchronizing the output display signals involves:
   substantially synchronizing timing signals of the first graphics processor and the second graphics processor; and
   substantially synchronizing data signals of the first graphics processor and the second graphics processor.

3. The method of claim 1, wherein the display blanking signals of the first and second graphics processors are vertical blanking signals.

4. The method of claim 1, wherein the switching takes place during a blanking interval associated with the display blanking signals of the first and second graphics processors.

5. The method of claim 4, wherein the blanking interval is a vertical blanking interval.

6. The method of claim 1, wherein configuring the second graphics processor involves:
   powering up the second graphics processor if necessary;
   initializing the second graphics processor; and
   generating output signals from the second graphics processor.

7. The method of claim 1, wherein prior to receiving the request to switch, the method further comprises:
   monitoring a level of graphics processing load; and
   generating the request to switch based on the level of graphics processing load.

8. The method of claim 7,
   wherein the first graphics processor is a high power graphics processing unit (GPU) and the second graphics processor is a low power GPU; and
   wherein a request to switch is generated when the level of graphics processing load is low.

9. The method of claim 7,
   wherein the first graphics processor is a low power graphics processing unit (GPU) and the second graphics processor is a high power GPU;
   wherein a request to switch is generated when the level of graphics processing load is high.

10. The method of claim 1, wherein the method further comprises powering down the first graphics processor after the switching.

11. A non-transitory computer-readable storage medium storing instructions that when executed by a computer cause the computer to perform a method for switching from a first graphics processor to a second graphics processor to drive a display, the method comprising:
   for a first plurality of image frames, generating a signal source which drives the display using the first graphics processor, wherein the second graphics processor is in a non-active state for the first plurality of image frames;
   receiving a request to switch a the signal source which drives the display from the first graphics processor to the second graphics processor; and
   in response to the request,
      configuring the second graphics processor so that the second graphics processor is ready to drive the display, wherein configuring the second graphics processor comprises substantially synchronizing output display signals from the first graphics processor and output display signals from the second graphics processor using a phase locked loop, wherein substantially synchronizing output display signals from the first and second graphics processor using a phase locked loop comprises:
         generating a reference frequency input using the phase locked loop;

selecting the reference frequency input as an input for a timing generator corresponding to the second graphics processor;

determining that the phase locked loop is phased-locked;

in response to determining that the phase locked loop is phase-locked, switching the signal source which drives the display from the first graphics processor to the second graphics processor, thereby causing the second graphics processor to drive the display, wherein switching the signal source comprises switching the input for the timing generator corresponding to the second graphics processor from the reference frequency input to an external clock source; and for a second plurality of image frames, generating a signal source which drives the display using the second graphics processor, wherein the first graphics processor is in a non-active state for the second plurality of image frames.

12. A computer system that switches from a first graphics processor to a second graphics processor to drive a display, comprising:

a processor;

a memory;

a first graphics processor;

a second graphics processor, wherein the first graphics processor and the second graphics processor have different operating characteristics;

a switching mechanism coupled to the first graphics processor and to the second graphics processor;

a display coupled to the switching mechanism, wherein the switching mechanism is configured to couple one of the two graphics processors to the display at a given time, and wherein the display is initially coupled to the first graphics processor for at least a first plurality of image frames while the second graphics processor is in a non-active state;

a receiving mechanism configured to receive a request to switch a signal source which drives the display from the first graphics processor to the second graphics processor;

a configuration mechanism configured to configure the second graphics processor so that the second graphics processor is ready to drive the display, wherein configuring the second graphics processor comprises substantially synchronizing output display signals from the first graphics processor and output display signals from the second graphics processor using first and second phase locked loops (PLLs), wherein the first phase locked loop generates a first reference frequency output to a first timing generator for the first graphics processor, wherein the second phase locked loop generates a second reference frequency output to a second timing generator for the second graphics processor, wherein the switching mechanism is configured to switch the signal source that drives the display from the first graphics processor to the second graphics processor such that the second graphics processor drives the display for at least a second plurality of image frames while the first graphics processor is in a non-active state.

13. The computer system of claim 12, wherein substantially synchronizing the output display signals involves:

substantially synchronizing timing signals of the first graphics processor and the second graphics processor; and substantially synchronizing data signals of the first graphics processor and the second graphics processor's data signals.

14. The computer system of claim 12, wherein substantially synchronizing the output display signals involves substantially aligning synchronization signals of the first and second graphics processors.

15. The computer system of claim 14, wherein the synchronization signal is a vertical blanking signal.

16. The computer system of claim 12, wherein configuring the second graphics processor involves:

powering up the second graphics processor if necessary;

initializing the second graphics processor; and generating output signals from the second graphics processor.

17. The computer system of claim 12, further comprising:

a monitoring mechanism configured to monitor a level of graphics processing load; and a generating mechanism configured to generate the request to switch based on the level of graphics processing load.

18. The computer system of claim 17, wherein the first graphics processor is a high power graphics processing unit (GPU) and the second graphics processor is a low power GPU; and wherein a request to switch is generated when the level of graphics processing load is low.

19. The computer system of claim 12, wherein the first graphics processor is a high power graphics processing unit (GPU) and the second graphics processor is a low power GPU; or wherein the first graphics processor is a low power graphics processing unit (GPU) and the second graphics processor is a high power GPU.

20. The computer system of claim 18, wherein the low power GPU is integrated with a system chip.

21. A method for switching from a first graphics processor to a second graphics processor to drive a display, comprising:

receiving a request to switch a signal source which drives the display from the first graphics processor to the second graphics processor; and in response to the request, configuring the second graphics processor so that the second graphics processor is ready to drive the display, wherein configuring the second graphics processor comprises substantially synchronizing output display signals from the first graphics processor and output display signals from the second graphics processor using one or more phase locked loops (PLLs);

switching the signal source which drives the display from the first graphics processor to the second graphics processor, thereby causing the second graphics processor to drive the display, wherein synchronizing the output display signals comprises using a first divider M and a second divider N in the PLL to produce output frequency $f_{OUT}$ from a reference frequency $f_{REF}$ in accordance with $f_{OUT}=f_{REF} \times (M/N)$, wherein M and N are programmable frequency scalar values.

22. The method of claim 21, wherein the method further comprises adjusting programmable frequency scalar values M and N to produce a desired output frequency $f_{OUT}$ during the synchronization operation.

* * * * *